United States Patent
McDowell et al.

(10) Patent No.: US 9,068,584 B2
(45) Date of Patent: Jun. 30, 2015

(54) APPARATUS AND METHODS FOR CONNECTING MATS

(71) Applicant: NEWPARK MATS & INTEGRATED SERVICES LLC, The Woodlands, TX (US)

(72) Inventors: James Kerwin McDowell, Lafayette, LA (US); Donald Scott Rogers, Lafayette, LA (US)

(73) Assignee: Newpark Mats & Integrated Services LLC, The Woodlands, TX (US)

(*) Notice: Subject to any disclaimer, the term of this patent is extended or adjusted under 35 U.S.C. 154(b) by 261 days.

(21) Appl. No.: 13/780,350

(22) Filed: Feb. 28, 2013

(65) Prior Publication Data
US 2014/0189985 A1    Jul. 10, 2014

Related U.S. Application Data

(60) Provisional application No. 61/748,818, filed on Jan. 4, 2013.

(51) Int. Cl.
| | |
|---|---|
| *F16B 43/00* | (2006.01) |
| *F16B 19/00* | (2006.01) |
| *E02B 3/12* | (2006.01) |
| *E02D 31/00* | (2006.01) |
| *F16B 21/02* | (2006.01) |
| *B29L 31/00* | (2006.01) |
| *B29C 65/56* | (2006.01) |

(Continued)

(52) U.S. Cl.
CPC .............. *F16B 19/008* (2013.01); *Y10T 24/42* (2015.01); *Y10T 29/49826* (2015.01); *E02B 3/126* (2013.01); *E02D 31/004* (2013.01); *B29L 2031/737* (2013.01); *B29C 65/562* (2013.01); *B29C 66/1122* (2013.01); *B29C 66/1282* (2013.01); *B29C 66/12841* (2013.01); *B29C 66/12861* (2013.01); *B29C 66/14* (2013.01); *B29C 66/43* (2013.01); *F16B 5/02* (2013.01); *F16B 21/02* (2013.01)

(58) Field of Classification Search
CPC .............. F16B 5/10; F16B 5/02; F16B 5/008; F16B 5/0036; F16B 5/00088; B29C 66/14; B29C 66/43; E02D 31/002; E02D 31/004; E02B 3/126
USPC ................... 411/371.1, 349; 24/453
See application file for complete search history.

(56) References Cited

U.S. PATENT DOCUMENTS

| | | | | |
|---|---|---|---|---|
| 1,785,709 A | * | 12/1930 | Campau | 411/368 |
| 2,335,828 A | * | 11/1943 | Herget | 411/349 |
| 2,390,325 A | * | 12/1945 | Rapp | 411/366.1 |

(Continued)

FOREIGN PATENT DOCUMENTS

| | | |
|---|---|---|
| DE | 3200555 A1 | 6/1983 |
| EP | 2423046 A2 | 2/2012 |

*Primary Examiner* — Gary Estremsky
(74) *Attorney, Agent, or Firm* — E. Randall Smith; Jones & Smith, LLP (57) ABSTRACT

An adjustable locking pin for connecting at least first and second overlapping mats includes an elongated main body, an elastomeric seal extending around the periphery of an enlarged head of the main body and an elongated rotor threadably engaged in a bore of the main body. The rotor is rotatable through at least two 360 degree revolutions of rotation relative to the main body and includes a foot at its bottom end. The rotational adjustability of the rotor allows the first and second mats to be tightly held together.

16 Claims, 5 Drawing Sheets

(51) Int. Cl.
*B29C 65/00* (2006.01)
*F16B 5/02* (2006.01)

(56) References Cited

U.S. PATENT DOCUMENTS

| | | | |
|---|---|---|---|
| 2,811,765 A | 11/1957 | Mathews, Jr. et al. | |
| 3,136,017 A | 6/1964 | Preziosi | |
| 3,407,454 A | 10/1968 | Myatt | |
| 4,047,266 A | 9/1977 | Bisbing | |
| 4,498,827 A | 2/1985 | Mair | |
| 4,591,307 A | 5/1986 | Clive-Smith | |
| 4,604,962 A | 8/1986 | Guibault | |
| 4,801,232 A | 1/1989 | Hempel | |
| 5,123,795 A | 6/1992 | Engel et al. | |
| 5,246,322 A * | 9/1993 | Salice | 411/15 |
| 5,346,349 A | 9/1994 | Giovannetti | |
| 5,370,488 A * | 12/1994 | Sykes | 411/551 |
| 5,632,586 A | 5/1997 | Nyholm | |
| 5,779,422 A | 7/1998 | Petignat | |
| 6,261,042 B1 * | 7/2001 | Pratt | 411/551 |
| 6,722,831 B2 | 4/2004 | Rogers et al. | |
| 2002/0147017 A1 * | 10/2002 | Li et al. | 455/447 |
| 2002/0187017 A1 | 12/2002 | Rogers et al. | |
| 2002/0192024 A1 | 12/2002 | Webster et al. | |

\* cited by examiner

APPARATUS AND METHODS FOR
CONNECTING MATS

The present application claims priority to U.S. Provisional Patent Application Ser. No. 61/748,818, filed on Jan. 4, 2013 and entitled "Apparatus and Methods for Connecting Mats", which is hereby incorporated by reference herein in its entirety.

FIELD OF THE DISCLOSURE

The present disclosure relates to connecting adjacent components of a modular load-supporting surface system.

BACKGROUND

Temporary or semi-permanent support surfaces have been used for roadways, remote jobsites, industrial staging areas and the like in an ever-increasing myriad of industries, such as construction, military, oilfield, transportation, disaster response, utilities and entertainment. These support surfaces are often made up of heavy duty, durable, all-weather, thermoplastic mats, which are reusable and interlock together to form the support surface. Traditionally, the mats include connecting holes that can be aligned on adjacent mats and through which removable locking pins are inserted for connecting the mats. However, many presently known locking pins are not adjustable to form a tight connection of adjacent mats in different circumstances.

In various known system, a plastic liner is placed below and around the mat assembly in an effort to capture liquids that are spilled, or otherwise introduced, onto the support surface before such liquids encounter the subgrade terrain. The use of liners with temporary or semi-permanent support surfaces may have one or more disadvantages. In many instances, once the need for the temporary support surface has lapsed, the interlocking mats are disassembled for later use. However, since the liners, unlike the mats, are not normally reusable, they must often be discarded. This can be problematic because landfill operators have expressed disinterest in accepting used liners on the basis that they are bulky and require excessive landfill space, or for other reasons. Thus, it can be difficult to find suitable cost-effective ways to dispose of the liners. For another example, the plastic liners are sometimes ineffective at preventing fluid leakage from the support surface or allowing effective clean-up, which can cause other problems and require significant time and effort. Thus, in some instances, there is a need for locking pins that can assist in forming a fluid tight seal between adjacent mats.

It should be understood that the above-described features, capabilities and disadvantages are provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features, capabilities or disadvantages merely because of the mention thereof herein.

Accordingly, there exists a need for improved systems, articles and methods useful for connecting components of a load-supporting surface having one or more of the attributes or capabilities described or shown in, or as may be apparent from, the other portions of this patent.

BRIEF SUMMARY OF THE DISCLOSURE

In some embodiments, the present disclosure involves an adjustable locking pin for connecting at least first and second overlapping mats placed upon the ground or another one or more surfaces. The first mat at least partially overlaps the second mat so that a connecting hole in the first mat is aligned over a connecting hole in the second mat. The apparatus includes an elongated main body having an upper end, a lower end and an at least partially threaded bore extending through the mats. The main body is configured to extend through the connecting hole of the first mat and into the connecting hole of the second mat and configured to prevent rotation therein. The main body includes an enlarged head at its upper end configured to at least partially seat within an indentation formed in an upper surface of the first mat around the connecting hole thereof. An elastomeric seal extends around the periphery of the enlarged head and is configured to form a fluid tight seal between the enlarged head and the indentation formed in the first mat. The main body also includes an elongated, at least partially threaded rotor threadably engaged in the bore of the main body and extending downwardly therefrom. The rotor has an upper end and a lower end and is configured to be rotatable through at least two 360 degree revolutions of rotation relative to the main body.

The rotor includes a foot disposed at its lower end and which is movable therewith relative to the main body. The foot is movable between multiple locking and multiple unlocked positions when the main body is disposed within the respective connecting holes of the first and second mats. In its unlocked positions, the foot is movable up through the connecting holes of the first and second mats. In its locking positions, the foot is non-movable up through the respective connecting holes of the first and second mats and is engageable with an indentation formed in a lower surface of the second mat around the connecting hole thereof.

The rotor is configured so that each 360° revolution of rotation thereof in one direction relative to the main body draws the foot closer to the bottom of the main body and provides at least two different locking positions of the foot. The foot in each successive locking position is configured to form a tighter connection of the first and second mats and increase the compression of the elastomeric seal between the enlarged head of the main body and the indentation formed in the first mat. The rotational adjustability of the rotor allows the first and second mats to be tightly held together.

In many embodiments, the present disclosure involves a method of connecting at least first and second overlapping mats placed upon the ground or another one or more surfaces with the use of an adjustable locking pin. The first mat at least partially overlaps the second mat so that a connecting hole in the first mat is aligned over a connecting hole in the second mat. The adjustable locking pin includes a main body with a threaded bore extending therethrough, a threaded rotor threadably engaged in the bore and extending downwardly therefrom, having a foot at its lower end and being rotatable in each direction through at least two 360 degree revolutions of rotation relative to the main body. The method includes inserting the main body through the connecting hole of the first mat and into the connecting hole of the second mat until the foot of the rotor is positioned below an indentation formed in the lower mat around the connecting hole thereof. The rotor is selectively rotated relative to the main body and the first and second mats (in the direction that moves the foot of the rotor closer to the main body) until an enlarged head at the upper end of the main body tightly engages an indentation formed in the first mat around the connecting hole thereof, and the foot of the rotor tightly engages the indentation formed in the lower mat, preventing vertical movement of either mat relative to the other at the location of the locking pin. An elastomeric seal extending around the periphery of the enlarged head is compressed and forms a fluid tight seal between the enlarged head and the indentation formed in the first mat, preventing the entry of liquid into the connecting hole of the first mat from above.

Accordingly, the present disclosure includes features and advantages which are believed to enable it to advance load-supporting surface technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF PREFERRED EMBODIMENTS

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . . " Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Figure 1:
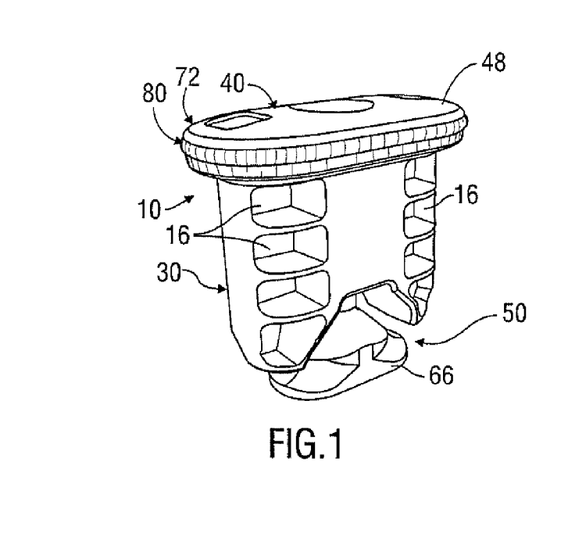
FIG. 1 is a perspective view of an embodiment of a locking pin in accordance with the present disclosure.
Figure 2:
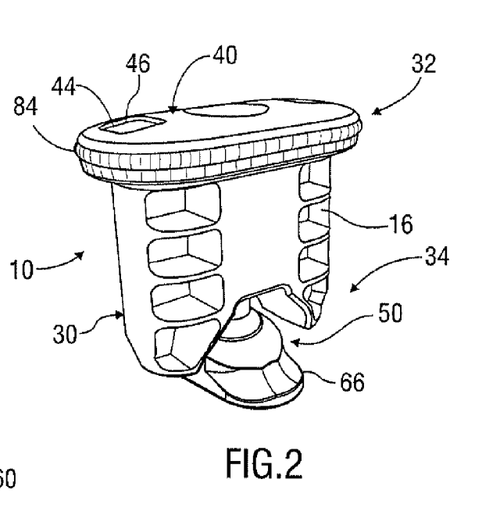
FIG. 2 is another perspective view of the exemplary locking pin of FIG. 1 having its rotor rotated 90°.
Figure 3:
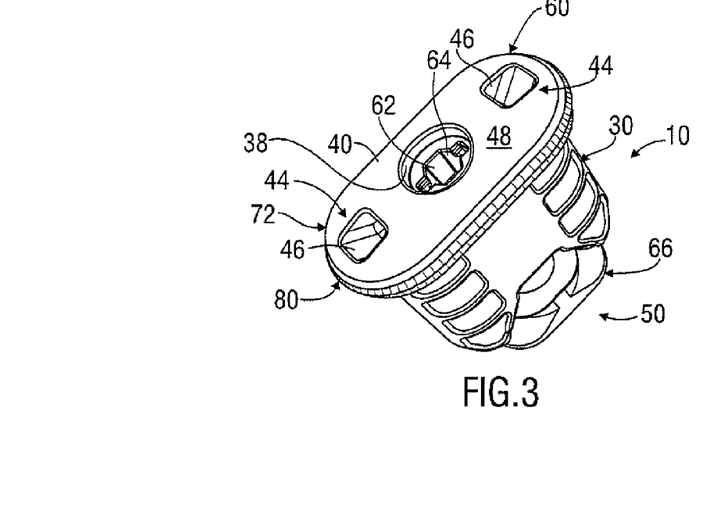
FIG. 3 is another perspective view of the exemplary locking pin of FIG. 1.

Referring initially to FIGS. 1-3, an embodiment of a mat locking pin 10 in accordance with the present disclosure is shown. The locking pin 10 is useful to connect, or secure together, at least first (upper) and second (lower) mats 12, 14 (e.g. FIG. 12A) placed upon one or more earthen or other surface 106. The illustrated mats 12, 14 are durable thermoplastic mats, such as the DURA-BASE® mats current sold by Applicant and useful, for example, as temporary roads, job-sites and staging areas. However, the present disclosure and appended claims are not limited to this type of mat. As used herein and in the appended claims, the terms "mat" and variations thereof include boards, mats, sheets, plates or other-shaped members desired to be connected together and constructed of any suitable material.

Figure 12A:
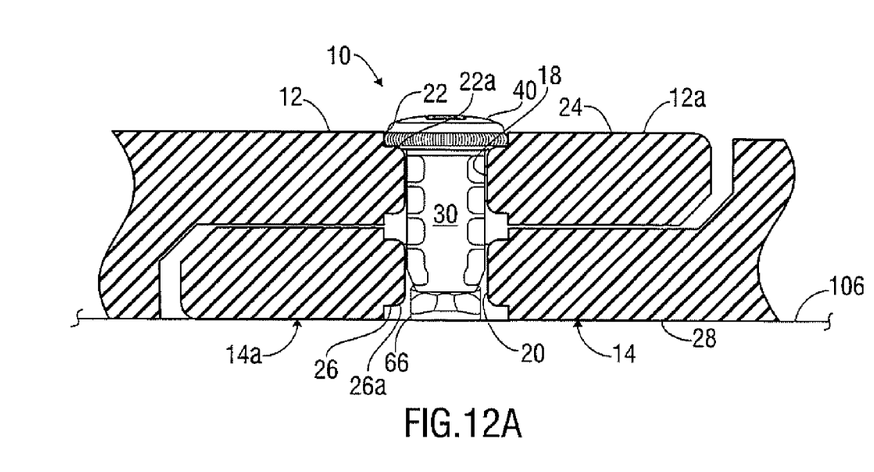
FIG. 12A is a side view of the exemplary locking pin of FIG. 1 shown disengaged with first and second mats shown in cross-section.

As shown in FIG. 12A, in this example application, the first mat 12 is positioned atop the second mat 14 so that a connecting hole 18 in an overlapping lip 12a of the first mat 12 is aligned over a connecting hole 20 in an overlapping lip 14a the second mat 14. The upper and lower surfaces of the illustrated mat lips 12a, 14a each include an indentation extending around each respective connecting hole 18, 20. For example, the upper surface 24 of the lip 12a of the first mat 12 includes an indentation 22 extending around its connecting hole 18, and the lower surface 28 of the lip 14a of the second mat 14 includes an indentation 26 formed around its connecting hole 20. The indentations 22, 26 each include a rim 22a, 26a that has a curved outer surface. The rim 22a, 26a thus has a circular arc or radius. The illustrated mats 12, 14 are at least substantially identical and, thus, reversible. In other words, the connecting hole 18 and indentation 22 of the lip 12a of the first mat 12 are generally the same as the connecting hole 20 and indentation 26 of the lip 14a of the second mat 14. While this particular form, configuration and arrangement of mats 12, 14 is known in the art, it is not limiting upon the present disclosure and appended claims. The locking pin 10 may be used with any suitable form, configuration and arrangement of mats 12, 14 or other sheets, plates or other-shaped members desired to be connected together.

Figures 4, 5, 6A, 6B, 7:
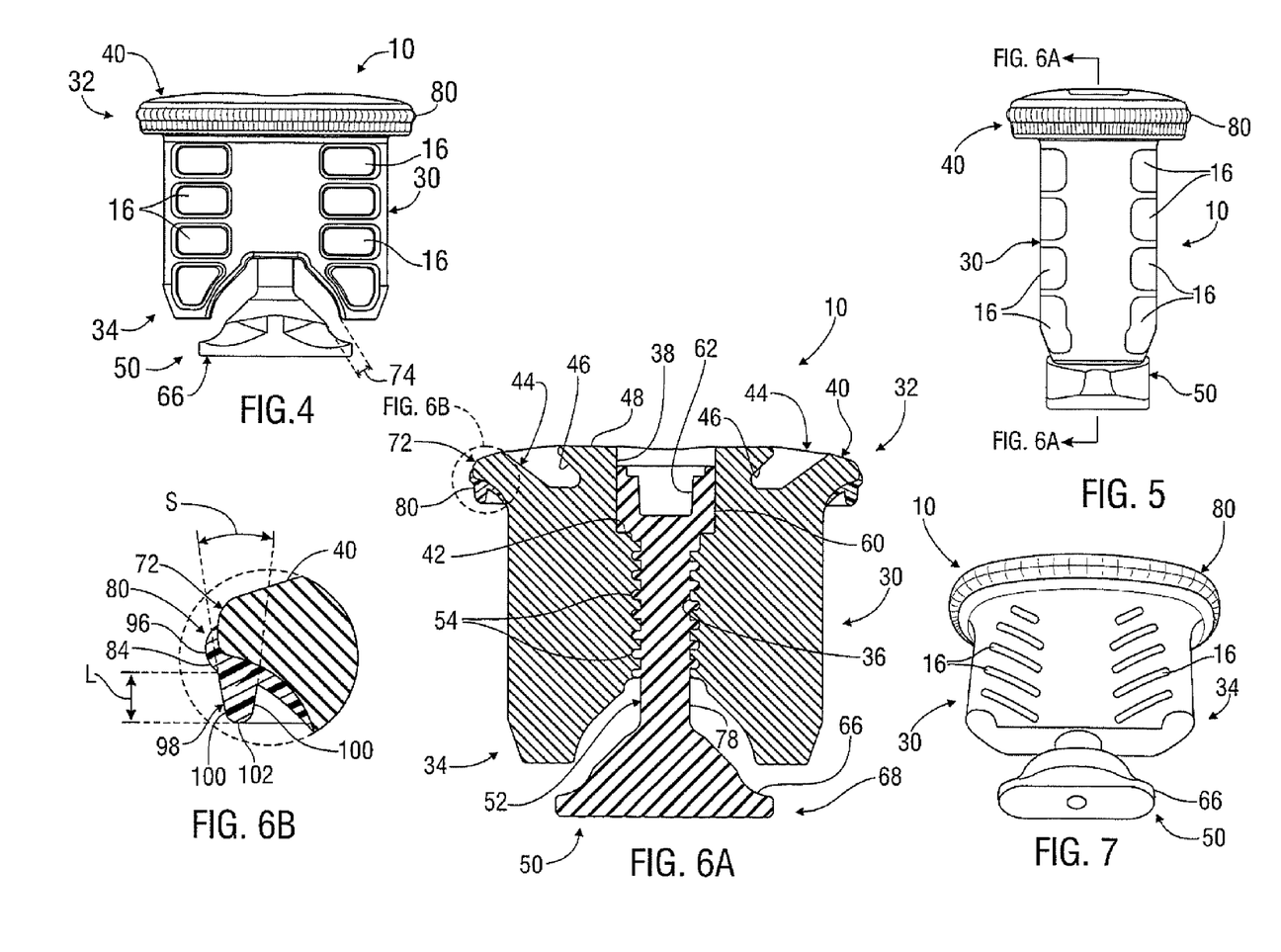
FIG. 4 is a front view of the exemplary locking pin of FIG. 1.
FIG. 5 is a side view of the exemplary locking pin of FIG. 1.
FIG. 6A is a cross-sectional view of the locking pin of FIG. 5 taken along lines 6-6.
FIG. 6B is an exploded view of the exemplary sealing member of the exemplary locking pin of FIG. 6A shown in cross-section.
FIG. 7 is a perspective view of another embodiment of a locking pin in accordance with the present disclosure.

Referring now to FIGS. 4-6, the exemplary locking pin 10 includes an elongated main body 30 and an at least partially-threaded elongated rotor 50 that is rotatable relative to the main body 30 and the first and second mats 12, 14 (e.g. FIG. 12A) when the locking pin 10 is engaged therewith. The main body 30 and rotor 50 may have any suitable form, configuration and operation. In this example, the main body 30 is constructed of high-strength, molded, thermoplastic and has an upper end 32, a lower end 34 and an at least partially-threaded bore 36 (FIG. 6A) extending therethrough.

If desired, excess material that is not necessary for operation and use of the locking pin 10 may be removed from the main body 30, such as to reduce the amount of material used, weight and/or cost of the locking pin 10 or any other desired purpose(s). In this embodiment, a series of weight reduction cut-outs 16 are formed in portions of the main body 30 where material is unnecessary. The weight reduction cut-outs 16 may have any form, configuration and location. For example, in FIG. 7, the weight reduction cut-outs 16 are slots. For yet another example, the weight reduction cut-outs 16 may be ribs (not shown). In addition or alternately, the main body 30 may be formed with a different shape to remove unnecessary material. For example, in the embodiment of FIG. 7, material is shown removed from the lower end 34 of the main body 30. However, it should be noted that the shape of the main body 30 and form of weight reduction cut-outs 16, if included, are not limiting upon the present disclosure.

Referring again to FIG. 12A, the illustrated main body 30 is configured to extend through the connecting hole 18 of the first mat 12 and into the connecting hole 20 of the second mat 14. The main body 30 and/or connecting holes 18, 20 may be configured to prevent rotation of the main body 30 in the holes 18, 20. For example, the main body 30 and/or connecting holes 18, 20 may have non-circular or asymmetrical shapes. In this embodiment, the main body 30 (e.g. FIG. 3) and connecting holes 18, 20 (e.g. FIG. 13B) all have oblong shapes, respectively. However, the main body 30 and/or holes 18, 20 may have different shapes or another suitable mechanism may be used to prevent rotation of the main body 40 in the holes 18, 20.

Referring to FIG. 6A, at its upper end 32, the illustrated main body 30 includes an enlarged head 40. The head 40 may have any suitable form, configuration and operation. In this example, the head 40 has a profile, or outer perimeter, that extends laterally beyond the profile, or outer perimeter, of the remainder of the main body 30 (see FIG. 3) and is engageable with the upper mat 12 (e.g. FIG. 12A). In this example, as shown in FIG. 12A, the illustrated head 40 is configured to at least partially seat within the indentation 22 and abut the rim 22a thereof. While the exemplary head 40 is shown protruding upwardly above the upper mat 12, there may be situations where the head 40 is flush with or even below the level of the upper surface 24 of the lip 12a of the first mat 12.

In addition, the illustrated head 40 may be configured not to rotate within the indentation 22. For example, the head 40 and indentation 22 may each have non-circular or asymmetrical shapes so that when the head 40 is seated in the indentation 22, the head 40 (and the body 30) cannot rotate relative to the mats 12, 14. In this embodiment, the head 40 and indentation 22 have oblong shapes, respectively. However, the head 40 and/or indentation 22 may have different shapes or another suitable mechanism may be used to prevent rotation of the head 40 in the indentation 22.

Still referring to FIG. 6A, the illustrated head 40 includes at least one extraction tool receiver 44 configured to receive an extraction tool (not shown) useful to remove the locking pin 10 from the mats 12, 14. The extraction tool receiver 44 may have any suitable form, configuration, operation and location. In this example, the receiver 44 includes a pair of angularly oriented extractor recesses 46 (see also FIG. 3) extending into the head 40 from the upper surface 48 thereof and spaced from the outer edge 72 thereof.

Still referring to FIG. 6A, the illustrated rotor 50 is constructed of cast metal, such as stainless steel, and includes a cylindrical shaft 52 having threads 54 that threadably mate with the bore 36 of the main body 30. The threaded engagement of the rotor 50 and main body 30 may be included for any suitable purpose(s). For example, as will be further described below, the threaded engagement allows the exemplary locking pin 10 to be adjustable relative to the mats 12, 14 (e.g. FIG. 12A). For another example, the threaded engagement of the rotor 50 and main body 30 may allow loads to be transferred to the main body 40 through the threads during use, providing increased strength of the locking pin 10.

Figure 8:
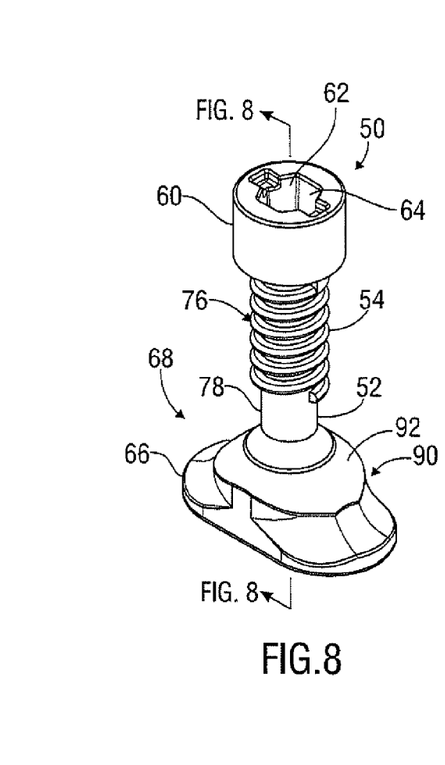
FIG. 8 is a perspective view of the exemplary rotor of the locking pin shown in FIG. 1.
Figure 9:
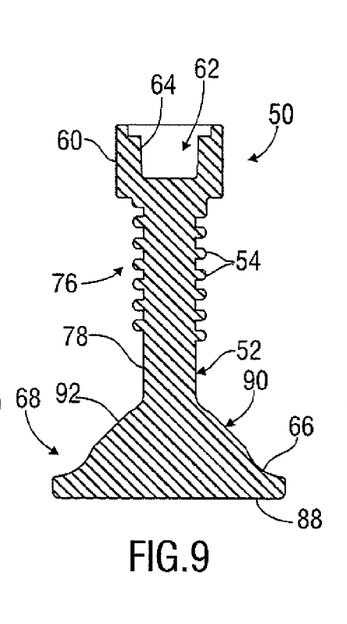
FIG. 9 is a cross-sectional view of the exemplary rotor shown in FIG. 8 taken along lines FIG. 8-FIG. 8.
Figure 10:
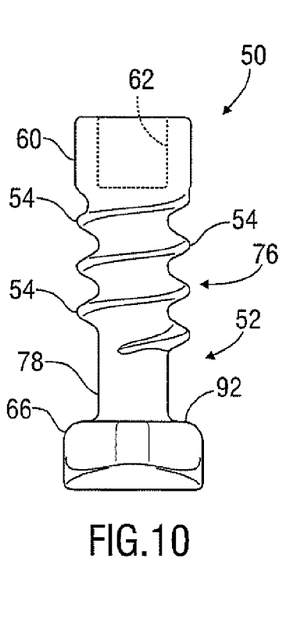
FIG. 10 is a side view of another embodiment of a rotor useful in one or more embodiments of the locking pin in accordance with the present disclosure.
Figure 11:
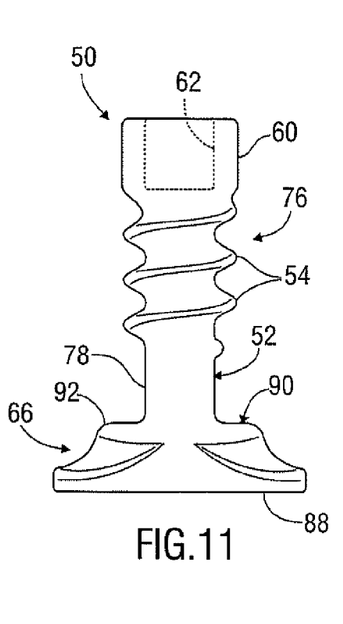
FIG. 11 is a front view of the exemplary rotor shown in FIG. 10.

The shaft 52 may have any suitable form and configuration. Referring to FIGS. 8 & 9, in this example, the shaft 52 includes a threaded section 76 having threads 54 and a non-threaded section 78 extending below the lowermost thread. The threads 54 may have any suitable dimensions and location. Further, any desired number of threads 54 may be included. In this example, six threads 54 are machined into the threaded section 76 of the shaft 52. For another example, in the embodiment of FIGS. 10 and 11, the shaft 52 includes three larger threads 54 spaced approximately ½ inches apart from each other at their peaks. The non-threaded section 78 of this example has a length of approximately 0.646 inches.

Referring back to FIGS. 8 & 9, at its upper end, the exemplary rotor 50 includes an enlarged head 60 that is axially moveable within an upper bore section 38 (FIG. 6A) of the bore 36. As shown in FIG. 6A, at its lowermost position in the bore section 38, the exemplary head 60 abuts a ledge 42 forming the bottom of the bore section 38. The illustrated head 60 includes a receiver 62 that may be used to rotate the rotor 50. In this embodiment, for example, the receiver 62 is a socket recess 64 shaped and configured to receive a driver (not shown) used to rotate the rotor 50 relative to the main body 30.

The illustrated rotor 50 also includes at least one foot 66 disposed at its lower end 68. As shown in FIG. 6A, when the exemplary rotor 50 is engaged in the bore 36 of the main body 30, the foot 66 is positioned below the lower end 34 of the main body 30. During use of the exemplary locking pin 10, as shown in FIG. 12A, when the main body 30 extends through the connecting hole 18 of the first mat 12 and into the connecting hole 20 of the second mat 14, the foot 66 may be positioned below the connecting hole 20 of the second mat 14 and effectively underneath the second mat 12. Although the illustrated foot 66 is shown flush with the bottom of the lower mat 14, the bottom of the foot 66 may protrude downwardly below the mat 14.

The foot 66 may have any suitable form, configuration and operation. In the embodiment of FIGS. 8 & 9, the foot 66 has an outer shape this is generally oblong, or asymmetrical, and extends outwardly of the outer profile of the other parts of the rotor 50. The bottom 88 of the illustrated foot 66 is at least substantially flat, while the top 90 has a generally upwardly and inwardly sloping surface 92 that blends into the shaft 52. In contrast, in the embodiment of FIGS. 9 & 10, the top 90 of the foot 66 is shown having a flat upper surface 92.

The exemplary foot 66 is rotatable between at least two positions relative to the main body 30 (and mats 12, 14) as the rotor 50 is rotated. In at least a first position, as shown in FIG. 1, the exemplary foot 66 lies generally within the profile of the main body 30 (see also FIG. 5), so that it aligns with and is movable through the respective connecting holes 18, 20 (e.g. FIG. 12A) of the mats 12, 14. Such positioning is referred to herein as the "unlocked" position of the foot 66. In a preferred embodiment, the foot 66 is in this general position when the locking pin 10 is inserted into and removed from the holes 18, 20.

Figure 13A:
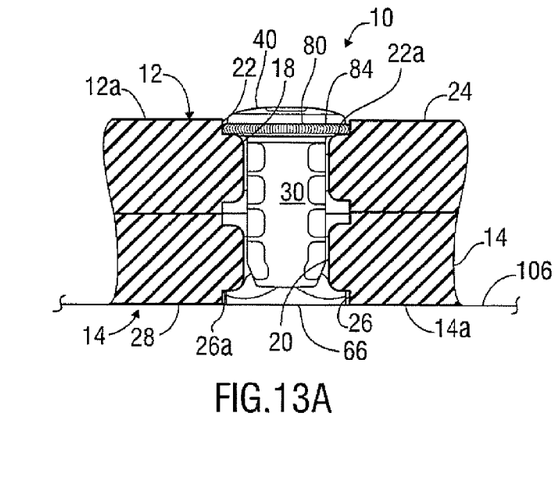
FIG. 13A is a side view of the exemplary locking pin of FIG. 1 shown engaged with first and second mats.

In at least a second position, such as shown in FIG. 2, the illustrated foot 66 extends outwardly of the profile of the main body 30. As shown in FIG. 13A, when the exemplary locking pin 10 is engaged with the mats 12, 14, the foot 66 in this position is misaligned with and non-movable through the holes 18, 20. This positioning of the exemplary foot 66 is generally used to secure the locking pin 10 to the mats 12, 14 and is referred to herein as the "locking" position of the foot 66. In this embodiment, when in one or more locking positions, the foot 66 is configured to at least partially engage the indentation 26 of the mat 14 and abut the rim 26a, preventing the foot 66 from passing up into the connecting hole 20, and anchoring the locking pin 10 to the mats 12, 14. The illustrated foot 66 is thus configured to rotate under the bottom mat 14 and seat in the indentation 26 thereof to tighten and secure the mats 12, 14 together and prevent removal of the locking pin 10.

Figure 14:
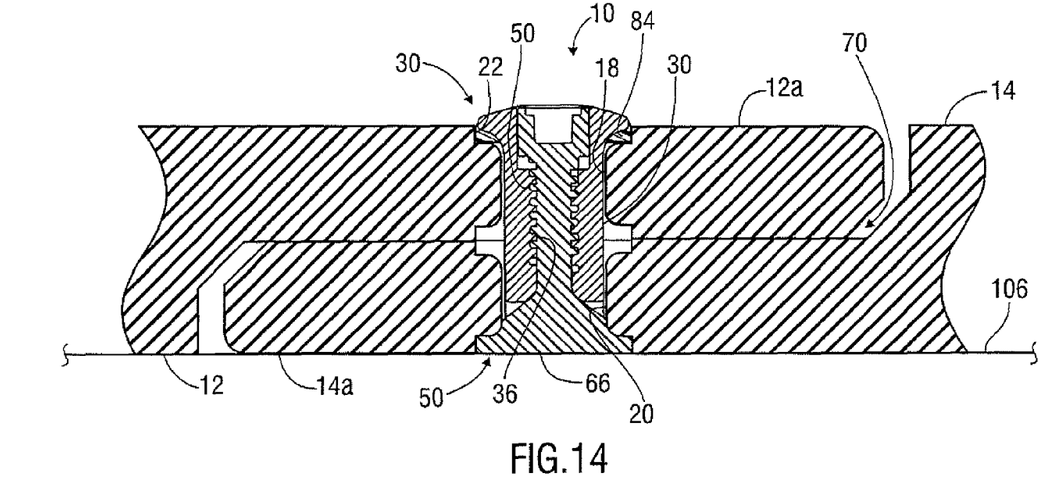
FIG. 14 is a cross-sectional view of the exemplary locking pin of FIG. 1 shown engaged with first and second mats.
Figure 15:
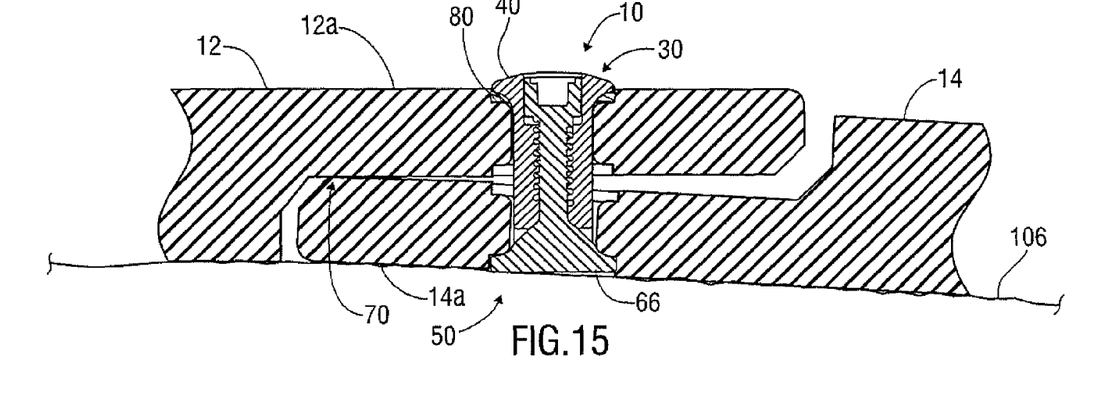
FIG. 15 is a cross-sectional view of the exemplary locking pin of FIG. 1 shown engaged with first and second mats on a non-horizontal surface.

Referring now to FIGS. 14 & 15, with the inclusion of the exemplary threaded rotor 50, the locking pin 10 of this embodiment is adjustable relative to the mats 12, 14 and has multiple different locking positions to tighten and hold the lips 12a, 14a together. These features may be provided for any desired purpose(s). For example, the rotational adjustability of the exemplary foot 66 relative to the main body 30 may allow the user to control and properly align the locking pin 10 in the holes 18, 20 and adjust the reach of the locking pin 10 relative to the mats 12, 14 to fit the particular circumstances. These capabilities may be beneficial, for example, to allow the locking pin 10 to be used to form a tight fit between mats 10, 12 having different thicknesses, shapes and/or sizes, assist in preventing or restricting undesirable "play" and/or vertical movement of one mat 12, 14 relative to the other mat 12, 14, assist in providing and maintaining a close interface 70 of the mats 12, 14, maintain a close relationship or tight fit of the mats 12, 14 on an uneven surface 106 (e.g. FIG. 15), assist in providing or allowing an at least partial fluid-tight seal at the upper end of the connecting hole 18 of the upper mat 12 and/or between the mats 12, 14, or a combination thereof. In some embodiments, if one or both of the connected mats 12, 14 deforms, degrades, shifts or otherwise moves over time or the mats become loose relative to one another, the rotor 50 may be readjusted to again establish a desired connection fit between the mats 12, 14.

The illustrated locking pin 10 may be adjustable relative to the mats 12, 14 and provide a range of locking positions in any suitable manner. As shown in FIG. 4, in this embodiment, the exemplary foot 66 is in spaced relationship via a gap 74 relative to the lower end 34 of the main body 30, allowing a range of axial movement of the foot 66 relative to the main body 30. As the rotor 50 is rotated in one direction (e.g. clockwise) relative to the main body 30, the foot 66 is drawn closer to the lower end 34 of the main body 30, reducing the size of the gap 74 associated with each successive locking position of the foot 66. This provides multiple locking positions of the locking pin 10 relative to the mats 12, 14. Rotation of the rotor 50 in the opposition direction will alternately move the foot 66 away from the main body 30, such as to loosen or disconnect the locking pin 10 from the mats 12, 14.

In the illustrated embodiment, each 360° clockwise revolution of the rotor 50 relative to the main body 30 provides a total of two different locking positions of the foot 66 and associated gap 74 sizes, as well as two different unlocked positions of the foot 66. In some embodiment, the locking pin 10 may be configured to move through at least two 360° revolutions of rotation. If the rotor 50 has three threads (e.g. FIG. 10), for example, the locking pin 10 may be configured to move through three 360° revolutions of rotation, providing a total of six different locking positions. However, the locking pin 10 may be configured to provide any desired number of different locking positions of the foot 66.

In FIG. 14, for example, the locking pin 10 is shown securing the mats 12, 14 together after a ¼, or 90°, turn of the rotor 50 (and foot 66). In this example, there is no space between the lips 12a, 14a of the mats 12, 14 at the mat interface 70. FIG. 15 shows the exemplary locking pin 10 used with mats 12, 14 on an uneven surface 106. While the illustrated lips 12a, 14a are not abutting along their entire lengths, at least a portion of the lips 12a, 14a are in contact at the mat interface 70. The number of turns of the rotor 50 necessary for sufficiently securing the mats 12, 14 together may vary depending upon the particular circumstances.

In another independent aspect of the present disclosure, if desired, the locking pin 10 may be used as part of a sealing, or spill management system, for a series of mats. For example, the locking pin 10 may provide a tight fit between the mats 10, 12 to inhibit the ingress of fluid and/or debris into the interface 70 (e.g. FIG. 14) between the mats 12, 14. For another example, the locking pin 10 may be configured to assist in preventing, or substantially inhibiting, the entry of fluid and/or debris into the connecting holes 18, 20 of the mats 12, 14. As shown in FIGS. 1-3, in some embodiments, the locking pin 10 may include one or more sealing members 80 extending around the periphery of the head 40 of the main body 30. In these embodiments, as the rotor 50 is rotated, the foot 66 effectively compresses the sealing member 80 against the upper mat 12 (e.g. FIG. 14) as it tightens the upper and lower mats 12, 14 together. The entire package, including the sealing member 80, head 40 of the main body 30, mats 12, 14 and foot 66 of the rotor 50 are effectively compressed or squeezed together.

Figure 13B:
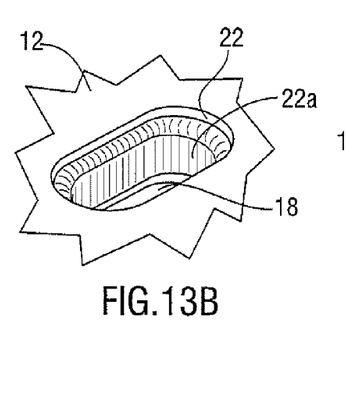
FIG. 13B is a perspective view of a connecting hole in an exemplary mat.
Figure 13C:
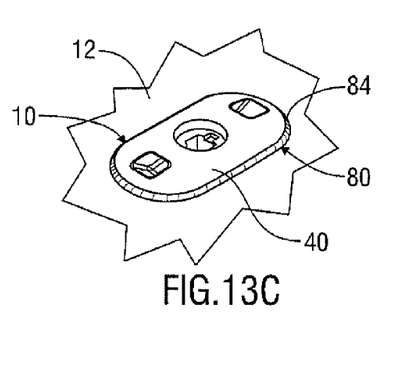
FIG. 13C is a perspective view of an exemplary locking pin engaged in the connecting hole of FIG. 13B in accordance with an embodiment of the present disclosure.

The sealing member(s) 80 may have any suitable form, configuration and operation. Referring to FIGS. 13A-C, for example, the sealing member 80 may be an elastomeric seal 84 configured to form an at least substantially fluid-tight seal between the head 40 of the main body 30 and the indentation 22 of the first mat 12, such as to prevent the entry of debris and/or fluid into the connecting hole 18 of the first mat 12 from above. As the locking pin 10 is tightened in place, the seal 84 will crush or deform between the head 40 and the rim 22a to form an at least substantially fluid tight seal around the connecting hole 18.

In this embodiment, as shown in FIG. 6B, the seal 84 is a separately molded gasket adhered at least partially to the edge 72 of the head 40. The illustrated seal 84 includes an upper bulb portion 96 and an elongated lip 98 extending downwardly therefrom. The exemplary lip 98 is shown formed in an overall, general V-shape, having a length L formed by inwardly tapered inner and outer sides 100 and a rounded bottom 102. For example, the length L of the lip 98 may be approximately 0.20 inches –0.40 inches, the span S of the tapered sides 100 may be approximately 10°-30° and the bottom 102 may be formed with a radius of approximately 0.03 inches –0.09 inches. In one preferred embodiment, the length L of the lip 98 may be approximately 0.30 inches, the span S of the tapered sides 100 may be approximately 20° and the bottom 102 may be formed with a radius of approximately 0.06 inches.

Figure 12B:
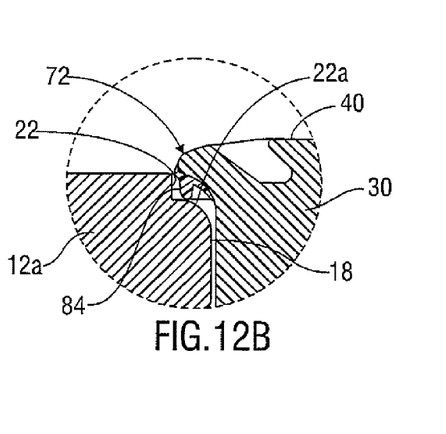
FIG. 12B is an exploded cross-sectional view of the exemplary sealing member of the exemplary locking pin of FIG. 12A.

As shown in FIG. 12B, the exemplary seal 84 is configured to abut the rim 22a of the indentation 22 around the head 40. During use of the exemplary locking pin 10, as the seal 84 is squeezed and compressed between the head 40 and the rim 22a of the indentation 22, the bottom 102 will engage the rim 22a and inner and outer sides 100 of the lip 98 will spread apart, causing the span S to expand and widen and the length of the lip 98 to decrease. In FIG. 14, for example, the exemplary seal 84 is shown squeezed or crushed in the indentation 22 of the upper mat 12. If desired, a removable sealing plug (not shown) or other sealing material may be insertable into the upper bore section 38 (FIG. 6A) of the main body 30 and/or the receiver 62 in the rotor 50, such as to assist in preventing the ingress of fluid and/or debris into the connecting holes 18, 20 from above.

If desired, the locking pin 10 may also or instead include one or more sealing members (not shown) extending around the periphery of the foot 66 of the rotor 50. This sealing member may be similar in construction and general operation to the sealing member 80 described above, except for use applied to the foot 66 engaging the rim 26a of the indentation 26 of the lower mat 14.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. Adjustable locking pin for connecting at least first and second overlapping mats placed upon the ground or another one or more surfaces, the first mat at least partially overlapping the second mat so that a connecting hole in the first mat is aligned over a connecting hole in the second mat, the apparatus comprising:

an elongated main body having an upper end, a lower end and an at least partially threaded bore extending through said main body, said main body being configured to extend through the connecting hole of the first mat and into the connecting hole of the second mat and configured to prevent its rotation therein, said main body having an enlarged head at said upper end configured to at least partially seat within an indentation formed an the upper surface of the first mat around the connecting hole thereof;

an elastomeric seal extending around the periphery of said enlarged head of said main body, said seal being configured to form a fluid tight seal between said enlarged head and the indentation formed in the first mat; and an elongated at least partially threaded rotor threadably engaged in said bore of said main body and extending downwardly therefrom, said rotor having an upper end and a lower end and being configured to be rotatable through at least two 360 degree revolutions of rotation relative to said main body, said rotor having a foot disposed at said lower end thereof and being movable therewith relative to said main body, said foot being movable between multiple locking and multiple unlocked positions when said main body is disposed within the respective connecting holes of the first and second mats, said foot in each said unlocked position being movable up through the connecting holes of the first and second mats, said foot in each said locking position being non-movable up through the respective connecting holes of the first and second mats and being engageable with an indentation formed in a lower surface of the second mat around the connecting hole thereof; and wherein said rotor is configured so that each 360° revolution of rotation thereof in one direction relative to said main body draws said foot closer to said bottom of said main body and provides at least two different locking positions of said foot, said foot in each successive locking position being configured to form a tighter connection of the first and second mats and increase the compression of said elastomeric seal between said enlarged head of said main body and the indentation formed in the first mat, whereby the rotational adjustability of said rotor allows the first and second mats to be tightly held together.

2. The adjustable locking pin of claim 1 wherein the indentation formed in the upper surface of the first mat has a rim extending around the connecting hole of the first mat, the rim having a curved outer surface, wherein said elastomeric seal is configured to engage and be compressed against the rim of the indentation.

3. The adjustable locking pin of claim 2 wherein said elastomeric seal is configured to prevent the entry of liquid into the connection hole of the first mat from above.

4. The adjustable locking pin of claim 2 wherein said elastomeric seal includes an upper bulb portion and an elongated lip extending downwardly therefrom, said upper bulb portion and elongated lip both extending around said enlarged head of said main body, said lip having a length defined by inwardly-tapered inner and outer sides terminating at a rounded bottom portion, wherein as said elastomeric seal is compressed between said enlarged head and the rim, said bottom portion of said lip is configured to engage said rim and said inner and outer sides of said lip are configured to spread apart relative to one another, shortening said length of said lip.

5. The adjustable locking pin of claim 4 wherein said lip has a non-compressed length of 0.20-0.40 inches, the span between said inner and outer sides is 10°-30° and said bottom portion has a radius of 0.03-0.06 inches.

6. The adjustable locking pin of claim 1 wherein the outer peripheral edge of said enlarged head of said main body has an unbroken oblong shape, further including at least one recess formed in said enlarged head to receive an extraction tool used for removing the adjustable locking pin from the first and second mats, said at least one recess extending into said enlarged head from the upper surface thereof and spaced away from said outer peripheral edge of said enlarged head to allow the formation of a fluid tight seal between said elastomeric seal extending around said enlarged head and the indentation formed in the first mat.

7. The adjustable locking pin of claim 6 wherein said rotor has at least three threads formed therein.

8. The adjustable locking pin of claim 7 wherein said foot has a flat upper surface.

9. The adjustable locking pin of claim 1 wherein said rotor is configured to allow the tight connection of at least first and second mats having different respective thicknesses or being disposed upon an uneven surface.

10. The adjustable locking pin of claim 9 wherein said main body has a plurality of weight reduction cut-outs formed therein.

11. The adjustable locking pin of claim 10 wherein said weight reduction cut-outs are at least one among a plurality of slots and a plurality of ribs formed in said main body.

12. A method of connecting at least first and second overlapping mats placed upon the ground or another one or more surfaces with the use of an adjustable locking pin, the first mat at least partially overlapping the second mat so that a connecting hole in the first mat is aligned over a connecting hole in the second mat, the adjustable locking pin having a main body with a threaded bore extending therethrough, a threaded rotor threadably engaged in the bore and extending downwardly therefrom, having a foot at its lower end and being rotatable in each direction through at least two 360 degree revolutions of rotation relative to the main body, the method comprising:

inserting the main body through the connecting hole of the first mat and into the connecting hole of the second mat until the foot of the rotor is positioned below an indentation formed in the lower mat around the connecting hole thereof;

selectively rotating the rotor relative to the main body and the first and second mats in the direction that moves the foot of the rotor closer to the main body until an enlarged head at the upper end of the main body tightly engages an indentation formed in the first mat around the connecting hole thereof and the foot of the rotor tightly engages the indentation formed in the lower mat, preventing vertical movement of either mat relative to the other at the location of the locking pin; and an elastomeric seal extending around the periphery of the enlarged head being compressed and forming a fluid tight seal between the enlarged head and the indentation formed in the first mat, preventing the entry of liquid into the connecting hole of the first mat from above.

13. The method of claim 12 wherein the elastomeric seal includes an upper bulb portion and an elongated lip extending downwardly therefrom, both the upper bulb portion and elongated lip extending around the perimeter of the enlarged head of the main body, further including compressing the lip of the elastomeric seal against the rim of the indentation to shorten the length of the lip and form a fluid tight seal.

14. The method of claim 12 further including rotating the rotor at least one full 360 revolution to tightly engage the enlarged head of the main body with the indentation formed in the first mat and tightly engage the foot of the rotor with the indentation formed in the lower mat, preventing vertical movement of either mat relative to the other at the location of the locking pin.

15. The method of claim 12 wherein the respective first and second mats have different thicknesses, further including rotating the rotor sufficient to tightly engage the enlarged head with the indentation formed in the first mat and tightly engage the foot of the rotor with the indentation formed in the lower mat, preventing vertical movement of either mat relative to the other at the location of the locking pin.

16. The method of claim 12 further including, after the passage of time since the first and second mats are connected with the adjustable locking pin and at least one of the mats has deformed, deteriorated or shifted, again selectively rotating the rotor relative to the main body and the first and second mats in the direction that moves the foot of the rotor closer to the main body until the enlarged head of the main body tightly engages the indentation of the first mat and the foot of the rotor tightly engages the indentation formed in the lower mat, preventing vertical movement of either mat relative to the other at the location of the locking pin.

* * * * *